US012621800B2

(12) United States Patent
Qu et al.

(10) Patent No.: US 12,621,800 B2
(45) Date of Patent: May 5, 2026

(54) METHOD FOR MOBILITY MANAGEMENT IN SATELLITE-TERRESTRIAL INTEGRATED NETWORK BASED ON BLOCKCHAIN

(71) Applicant: ZTE Corporation, Shenzhen (CN)

(72) Inventors: Zhicheng Qu, Shenzhen (CN); Zheng Huang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 322 days.

(21) Appl. No.: 18/521,666

(22) Filed: Nov. 28, 2023

(65) Prior Publication Data

US 2024/0098699 A1     Mar. 21, 2024

Related U.S. Application Data

(63) Continuation of application No. PCT/CN2021/102827, filed on Jun. 28, 2021.

(51) Int. Cl.
H04W 68/02          (2009.01)

(52) U.S. Cl.
CPC ..................................... H04W 68/02 (2013.01)

(58) Field of Classification Search
CPC ....... H04W 68/02; H04W 8/02; H04W 84/06; H04W 92/24; H04L 2209/80; H04L 9/50; H04B 7/18539
See application file for complete search history.

(56) References Cited

U.S. PATENT DOCUMENTS

| | | | |
|---|---|---|---|
| 10,299,128 B1 | 5/2019 | Suthar et al. | |
| 11,910,305 B2 * | 2/2024 | Buyukdura | H04W 12/10 |
| 2021/0105065 A1 | 4/2021 | Ravishankar et al. | |
| 2022/0191685 A1 * | 6/2022 | Hu | H04L 9/3247 |
| 2023/0262113 A1 * | 8/2023 | Li | H04L 67/1097 |
| | | | 709/226 |

FOREIGN PATENT DOCUMENTS

| | | | | |
|---|---|---|---|---|
| CN | 111163466 A | 5/2020 | | |
| CN | 111465002 A | 7/2020 | | |
| CN | 112449343 A | 3/2021 | | |
| KR | 20210019755 A | * 2/2021 | | H04L 9/50 |
| WO | WO 2021/069085 A1 | 4/2021 | | |

OTHER PUBLICATIONS

Communication for European Patent Application No. 21 947 413.7 mailed Sep. 30, 2024 (9 pages).
Office Action issued for the EP Patent Application No. 21 947 413.7 dated Jul. 18, 2025 (8 pp.).
International Search Report and Written Opinion received for Application No. PCT/CN2021/102827, mailed Apr. 1, 2022 (7 pages).
Intel; "Updates of Use case 5.3 for accessing home network service via PALS network; S1-210225;" *3GPP TSG-SA WG1 Meeting #93e*; Mar. 4, 2021 (4 pp.).

* cited by examiner

*Primary Examiner* — Siu M Lee
(74) *Attorney, Agent, or Firm* — Crowell & Moring LLP

(57)          ABSTRACT

A wireless communication method for use in a blockchain node is disclosed. The method comprises receiving, from an access and mobility management function, a query request associated with paging information of a wireless terminal, determining the paging information based on registration information of the wireless terminal, wherein the registration information is stored on a blockchain, and transmitting, to the access and mobility management function, the paging information.

7 Claims, 6 Drawing Sheets

701

Receive, from a wireless terminal, registration
information of the wireless terminal

702

Record the registration information of the
wireless terminal on a blockchain

METHOD FOR MOBILITY MANAGEMENT IN SATELLITE-TERRESTRIAL INTEGRATED NETWORK BASED ON BLOCKCHAIN

CROSS-REFERENCE TO RELATED APPLICATION

This application is a continuation of PCT/CN2021/102827, filed on Jun. 28, 2021, titled "A METHOD FOR MOBILITY MANAGEMENT IN SATELLITE-TERRESTRIAL INTEGRATED NETWORK BASED ON BLOCKCHAIN", published as WO 2023/272449 A1, the entirety of which is incorporated herein by reference.

TECHNICAL FIELD

This document is directed generally to wireless communications.

BACKGROUND

When base stations (e.g. gNBs) are on-board non geostationary satellites, the attached cells and tracking areas move with the corresponding gNBs. Contrary to terrestrial access networks, the non-terrestrial network may have a potential disconnect between geographical coverage, cell definition and tracking area and RA definitions. Under such conditions, how to re-select the cell from a serving cell disappearing below the horizon and another cell emerging in quick succession becomes a new mobility challenge even for a stationary UE. In addition, because the network is not fully aware of the UE location, the network may need to page the UE within a considerable large area.

SUMMARY

This document relates to methods, systems, and devices for mobility management based on blockchain, and particularly to methods, systems, and devices for mobility management in a satellite-terrestrial integrated network based on the blockchain.

The present disclosure relates to a wireless communication method for use in a blockchain node. The method comprises:

receiving, from an access and mobility management function, a query request associated with paging information of a wireless terminal, determining the paging information based on registration information of the wireless terminal, wherein the registration information is stored on a blockchain, and transmitting, to the access and mobility management function, the paging information.

Various embodiments may preferably implement the following features:

Preferably, the paging information is determined via a smart contract of the blockchain.

Preferably, the paging information comprises a paging route from the access and mobility management function to the wireless terminal.

Preferably, the paging route is determined based on the registration information and an operation plan of a wireless network node serving the wireless terminal, wherein the operation plan is stored on the blockchain.

Preferably, the operation plan comprises at least one of ephemerides, a frequency plan, an inter satellite link status or beam plan.

Preferably, the registration information comprises at least one of a wireless terminal identifier, geolocation information, a registration time or a predefined trajectory.

The present disclosure relates to a wireless communication method for use in an access and mobility management function. The method comprises:

transmitting, to a blockchain node associated with a blockchain, a query request associated with paging information of a wireless terminal via a smart contract of the blockchain, receiving, from the blockchain node, the paging information, and paging the wireless terminal based on the paging information.

Various embodiments may preferably implement the following features:

Preferably, the paging information comprises a paging route from the access and mobility management function to the wireless terminal.

Preferably, the paging route is determined based on registration information of the wireless terminal and an operation plan of a wireless network node serving the wireless terminal, wherein the registration information and the operation plan are stored on the blockchain.

Preferably, the operation plan comprises at least one of ephemerides, a frequency plan, an inter satellite link status or beam plan.

Preferably, the paging information is determined based on registration information of the wireless terminal stored on the blockchain.

Preferably, the registration information comprises at least one of a wireless terminal identifier, geolocation information, a registration time or a predefined trajectory.

The present disclosure relates to a wireless communication method for use in a wireless network node. The method comprises:

receiving, from a wireless terminal, registration information of the wireless terminal, and recording the registration information of the wireless terminal on a blockchain.

Various embodiments may preferably implement the following features:

Preferably, the registration information comprises at least one of a wireless terminal identifier, geolocation information, a registration time or a predefined trajectory.

Preferably, the registration information is received in a registration request or a registration update request.

Preferably, the registration information is recorded on the blockchain via a smart contract of the blockchain.

Preferably, recording the registration information of the wireless terminal on the blockchain comprises:

recording the registration information and network node information of the wireless network node on the blockchain.

Preferably, the wireless communication method further comprises deactivating former registration information of the wireless terminal, wherein the former registration information is recorded on the blockchain before receiving the registration information from the wireless terminal.

Preferably, the former registration information is deactivated via a smart contract of the blockchain.

The present disclosure relates to a blockchain node. The blockchain node comprises:

a communication unit, configured to receive, from an access and mobility management function, a query request associated with paging information of a wireless terminal, and a processor configured to determine the paging information based on registration information of the wireless terminal, wherein the registration information is stored on a blockchain, wherein the communication unit is further configured to transmit, to the access and mobility management function, the paging information.

Various embodiments may preferably implement the following feature:

Preferably, the processor is further configured perform any of aforementioned wireless communication methods.

The present disclosure relates to a wireless device comprising an access and mobility management function. The wireless device comprises:

a communication unit, configured to:

transmit, to a blockchain node associated with a blockchain, a query request associated with paging information of a wireless terminal via a smart contract of the blockchain, and receive, from the blockchain node, the paging information, and a processor configured to page the wireless terminal based on the paging information.

Various embodiments may preferably implement the following feature:

Preferably, the processor is further configured perform any of aforementioned wireless communication methods.

The present disclosure relates to wireless network node. The wireless network node comprises:

a communication unit, configured to receive, from a wireless terminal, registration information of the wireless terminal, and a processor configured to record the registration information of the wireless terminal on a blockchain.

Various embodiments may preferably implement the following feature:

Preferably, the processor is further configured perform any of aforementioned wireless communication methods.

The present disclosure relates to a computer program product comprising a computer-readable program medium code stored thereupon, the code, when executed by a processor, causing the processor to implement a wireless communication method recited in any one of foregoing methods.

The exemplary embodiments disclosed herein are directed to providing features that will become readily apparent by reference to the following description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

The above and other aspects and their implementations are described in greater detail in the drawings, the descriptions, and the claims.

DETAILED DESCRIPTION

In the present disclosure, a radio access network (RAN) node may be represented by RAN.

In an embodiment, the registration and paging procedures allow RAN node (e.g. gNB, satellite RAN (SAT-RAN)) in the constellation to be grouped in a single tracking area (TA) or groups of TAs. The access and mobility management function (AMF) may compose a corresponding TA identifier (TAI) List and send the TAI List to the UE. When the RAN node is a non-geostationary gNB (e.g. SAT-RAN), the Registration Area (RA) assigned to the UE is also the paging area for mobile terminated (MT) signaling and data. If the non-geostationary gNBs are grouped to single TA or issued to the UE as a single TAI List, the UE needs not to perform Mobility Registration Updates but the network is not fully aware of the UE location and may need to page the UE over a considerable large area. The network awareness of the UE location may be improved by assigning each non-geostationary gNB a distinct TAI and by not including a multitude of TAIs in the RA that is issued to the UE. The improved network awareness of the UE location increases the efficiency of the paging procedure, e.g., at the cost of substantially increased Mobility Registration Update signaling when re-selecting between non-geostationary gNBs.

Figure 1:
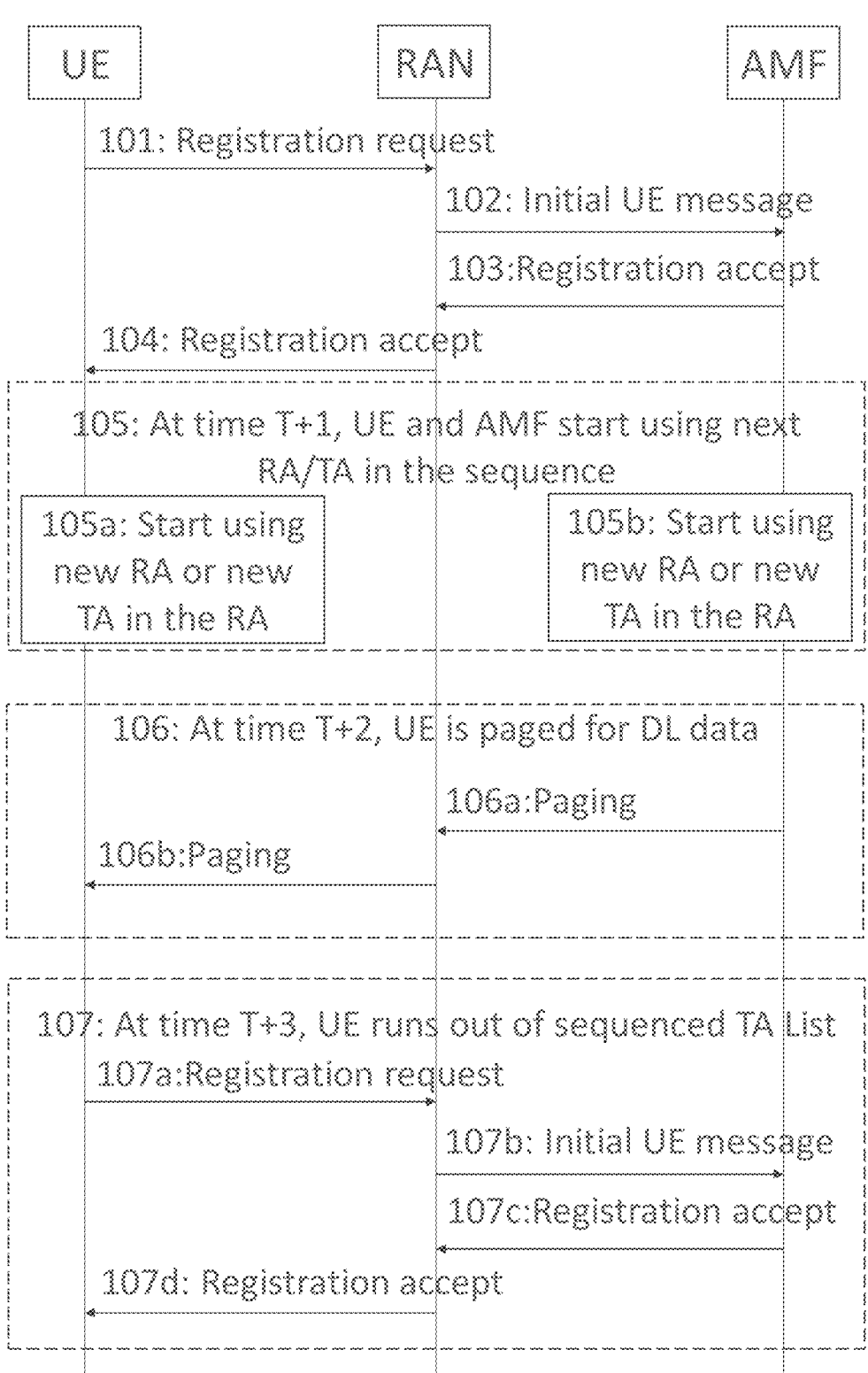
FIG. 1 shows a schematic diagram of registration and paging procedures according to an embodiment of the present disclosure.

FIG. 1 shows a schematic diagram of registration and paging procedures according to an embodiment of the present disclosure. In FIG. 1, the AMF may assign an ordered sequence of RAs based on the non-geostationary satellite ephemerides of the RAN (e.g. SAT-RAN), where the non-geostationary satellite ephemerides are mastered by the satellite operator and/or network provider. When the AMF detects a UE registration procedure via a satellite access, the AMF sends the derived sequenced RA List to the UE and stores the derived sequenced RA List as part of the UE context (steps 101 to 104). In an embodiment, the derived sequenced RA List may include validity times of RAs in the derived sequenced RA List. When the validity time of an active RA expires, both the AMF and UE take the next RA in the RA List and as the active RA until the corresponding validity time expires (step 105). In an embodiment, the UE initiates a Mobility Registration Update if stepping outside of the predicted sequence of RAs in the RA List. For downlink (DL) data or signaling, the AMF pages the UE in the active RA (step 106). The AMF may optionally page the UE in both the previous RA and in the next RA of the active RA, so as to cover the unpredict-ability of the UE performing cell re-selection and selecting the new satellite cell.

However, the ordered sequence of the RAs is not guar-anteed to be identical on both, the AMF and UE side. Further, the RA sequence derived by the AMF may have defects. Even worse, a malicious AMF may tamper the RA sequence and validation time, resulting in paging failure. In addition, the ordered sequence of RAs may be a long list depending on the constellation and beam coverage design, which may become a burden for satellite channels. On the other hand, once the UE runs out the sequenced RAs in the RA List, the UE needs to request another RA List (e.g. by performing step 107 or the registration procedure). There may be a tradeoff between the size of the RA List and the number of times of the UE requesting the RA List.

In an embodiment, at the beginning of network in opera-tion, the satellite operator and/or network operator/provider builds a blockchain for storing/recording the RA(s). The blockchain participants/nodes of the corresponding block-chain network may have either part or full blockchain functions and may include satellite components (including all kinds of satellites in network operation), satellite control centers, and corresponding network functions (e.g., AMF). The satellite operation plan (including but not limited to ephemerides, frequency plan, inter satellite link status, beam plan, etc.) of each satellite (e.g. RAN node) is recorded on the blockchain at the beginning of network in operation and reaches consensus among all participants of the blockchain network. Any updates to the satellite operation plan shall be updated on the blockchain simultaneously. The blockchain may provide at least one of the following smart contracts (SCs):

1. SC associated with calculating the corresponding RA of a UE based on geolocation information (GI) of the UE and the satellite operation plan.
2. SC associated with RAN nodes making records on the blockchain.
3. SC associated with RAN nodes updating UE informa-tion by deactivating the former on-chain information belongs to the same UE.

Note that some or all of these SCs may be combined into one SC with corresponding functions. For example, there may be one SC comprising at least two of a calculating function associated with calculating the corresponding RA based on the GI of the UE and the satellite operation plan, a recording function associated with the RAN nodes making records on the blockchain and an updating function associ-ated with RAN nodes updating UE information by deacti-vating the former on-chain information belongs to the same UE.

Figure 2A:
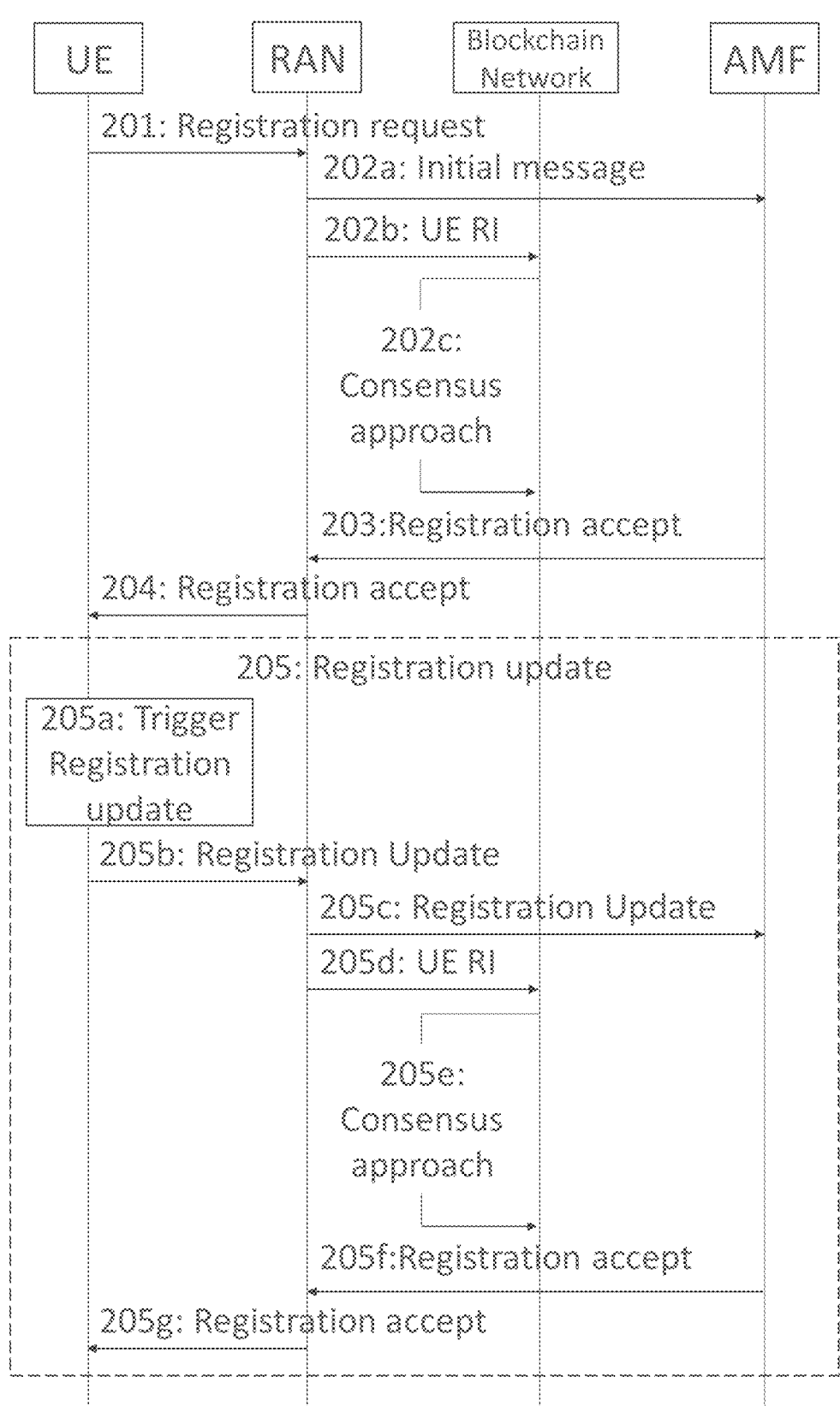
FIGS. 2A and 2B show schematic diagrams of registration and paging procedures according to an embodiment of the present disclosure.
Figure 2B:
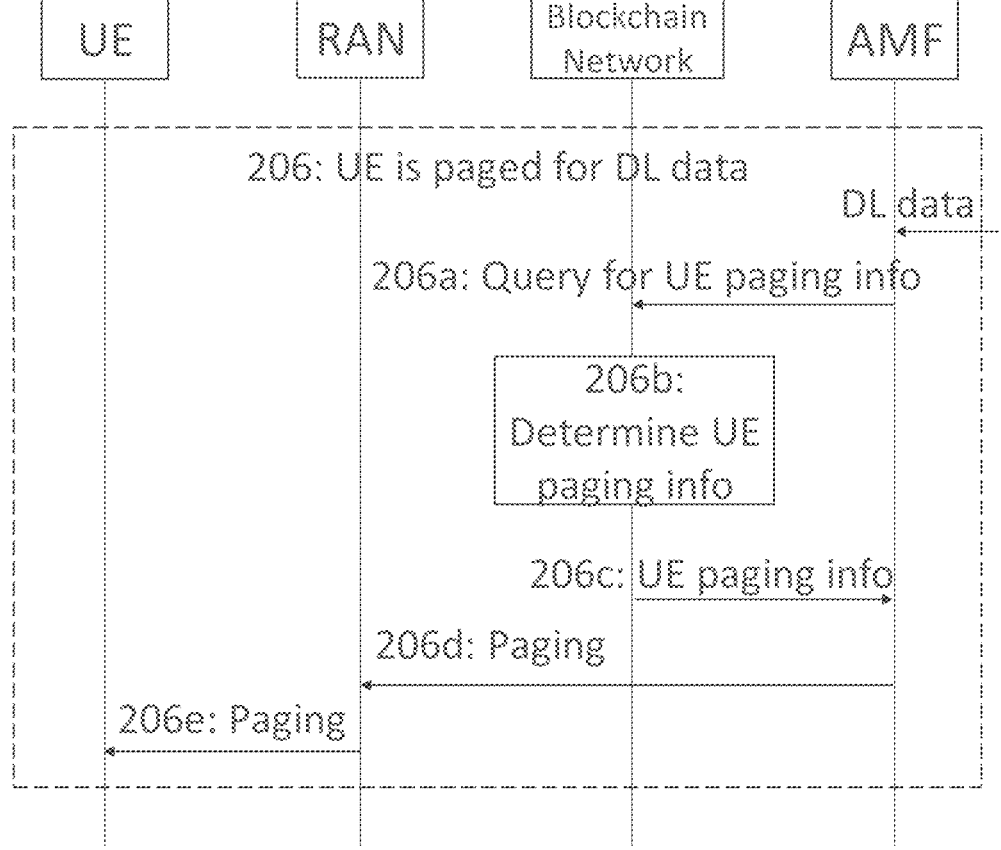

FIGS. 2A and 2B show schematic diagrams of a regis-tration and paging procedure according to an embodiment of the present disclosure. In FIGS. 2A and 2B, the registration and paging procedure involves operations associated with a blockchain network. Note that it is assumed that the UE has the ability to aware and report its own GI in this embodi-ment. In addition, the RAN node in FIGS. 2A and 2B may be a non-geostationary RAN node (e.g. SAT-RAN).

In detail, in step 201 of FIG. 2A, the UE detects the need to register with the network and initiates a Registration Request. Apart from a predefined AN message, the regis-tration information (RI) of the UE may also include at least one of the GI, registration time (RT) and (predefined) trajectory, etc. Note that the RI of the UE may be determined based on the mobility capability of the UE. For example, a stationary UE (e.g. an IoT device deployed in a fixed place) may report the GI and RT in its RI in the registration request. In an embodiment, a moving UE with determined/pre-defined trajectory (e.g. an airplane, a train or a ship) may report the GI, the RT and the predefined trajectory in its RI in the registration request. In an embodiment, a stochastic moving UE with a low mobility may report the GI and RT in its RI and updates its RI in a triggered mobility update registration procedure.

In step 202a, the RAN node identifies a satellite access to the core network (CN) and transmit an Initial (UE) Message that encapsulates the Registration Request to the AMF.

In step 202b, the RAN node (e.g. satellite) records the RI of the UE (e.g. GI, RT and (predefined) trajectory (if valid), etc.) and state information of the RAN node (e.g. RAN node identifier, current time, RAN node signature) on a block-chain of the blockchain network with RAN node signature via an SC of the blockchain. The RI of the UE is signed by the UE itself. This record will be distributed in the block-chain network (i.e. to each blockchain node/participant) for consensus among blockchain participants/nodes (step 202c).

In step 203, the AMF is aware of the satellite access of the UE based on the indication received from the RAN. The AMF sends a registration accept acknowledgment to the RAN node.

In step 204, the RAN node passes the Registration Accept acknowledgment to the UE.

In step 205, the UE initiates a Registration Update (pro-cedure). For example, the registration update (procedure) may be a mobility registration update (procedure). That is, the registration update may be triggered by the UE mobility. Note that the UE may be idle for a period before the step 205.

In step 205a, the UE initiates the Registration Update, e.g., triggered by pre-defined criteria(s).

In steps 205b and 205c, the UE updates its RI to the RAN node. The RAN node identifies the satellite access of the UE to the CN and transmits the Initial Message that encapsulates the Registration Update.

In step 205d, the RAN node updates updated RI of the UE to the blockchain. In an embodiment, the RAN node may further deactivate the former RI of the UE stored on the blockchain via a SC (or a function of SC). The updated RI is distributed in the blockchain network for consensus among blockchain participants (step 205e).

In steps 205f and 205g, the registration update received from the RAN informs the AMF of satellite access. The AMF sends a registration accept acknowledgment to RAN node and the RAN node passes the Registration Accept acknowledgment to the UE.

In step 206 shown in FIG. 2B, the UE is paged for DL data by the AMF. In the process performed step 206, the UE is paged via the blockchain.

In step 206a, the AMF queries the blockchain network (e.g. at least one blockchain node/participant) for paging information of the UE.

In step 206b and step 206c, the blockchain node derives the currently active RA at the time of receiving the query request from the AMF and calculates a (proper) paging route(s) from the AMF to the UE via the SC. The paging route(s) is sent to AMF as the (UE) paging information and deployed.

In step 206*d* and 206*e*, the AMF pages the UE for the DL data based in the (UE) paging information (i.e. the paging route(s)).

In an embodiment, the AMF may query the blockchain node for the latest updated RI of the UE (e.g. in step 206*a*) and calculate the paging information (e.g. paging route) of the UE via using the SC and the queried RI (e.g. after step 206*c*).

In an embodiment of the AMF being one blockchain participant/node, the AMF may directly determine the paging information via the SC.

In the present disclosure, the satellite operation plan (including but not limited to ephemerides, beam plan, frequency plan, inter satellite link status, etc.) is recorded on the blockchain. The recorded satellite operation plan has been reached consensus among all blockchain participants, which avoids malicious tamper of the satellite operation plan. The ordered RA sequence can be derived based on the satellite operation plan via the SC rather than being determined by single AMF.

When the registration procedure of the UE is initiated, the RAN node records the UE singed RI (including but not limited to UE ID, geolocation information, (predefined) trajectory, etc.) on the blockchain via the SC. In addition, the RAN node may record the UE singed RI combined with the RAN node state information on the blockchain via the SC, where the RAN node state information is singed by the signature of the RAN node.

In an embodiment, when initiating the paging procedure, the AMF queries the paging information (e.g. paging route) from the blockchain node and paging the UE based on the queried paging information.

As an alternative, when initiating the paging procedure, the AMF checks/queries the UE RI stored on the blockchain and computes the paging route according to the UE RI stored on the blockchain via the SC.

Note that the process in step 205 or 206 may be performed separately.

Figures 3, 4:
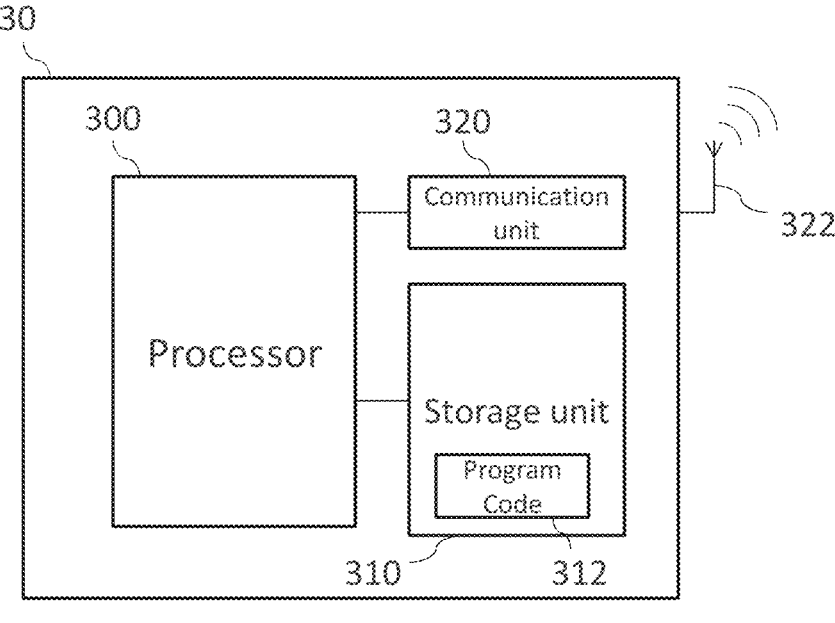
FIG. 3 shows an example of a schematic diagram of a wireless terminal according to an embodiment of the present disclosure.
FIG. 4 shows an example of a schematic diagram of a wireless network node according to an embodiment of the present disclosure.

FIG. 3 relates to a schematic diagram of a wireless terminal 30 according to an embodiment of the present disclosure. The wireless terminal 30 may be a user equipment (UE), a mobile phone, a laptop, a tablet computer, an electronic book or a portable computer system and is not limited herein. The wireless terminal 30 may include a processor 300 such as a microprocessor or Application Specific Integrated Circuit (ASIC), a storage unit 310 and a communication unit 320. The storage unit 310 may be any data storage device that stores a program code 312, which is accessed and executed by the processor 300. Embodiments of the storage unit 312 include but are not limited to a subscriber identity module (SIM), read-only memory (ROM), flash memory, random-access memory (RAM), hard-disk, and optical data storage device. The communication unit 320 may a transceiver and is used to transmit and receive signals (e.g. messages or packets) according to processing results of the processor 300. In an embodiment, the communication unit 320 transmits and receives the signals via at least one antenna 322 shown in FIG. 3.

In an embodiment, the storage unit 310 and the program code 312 may be omitted and the processor 300 may include a storage unit with stored program code.

The processor 300 may implement any one of the steps in exemplified embodiments on the wireless terminal 30, e.g., by executing the program code 312.

The communication unit 320 may be a transceiver. The communication unit 320 may as an alternative or in addition be combining a transmitting unit and a receiving unit configured to transmit and to receive, respectively, signals to and from a wireless network node (e.g. a base station).

FIG. 4 relates to a schematic diagram of a wireless network node 40 according to an embodiment of the present disclosure. The wireless network node 40 may be a satellite, a base station (BS), a network entity, a Mobility Management Entity (MME), Serving Gateway (S-GW), Packet Data Network (PDN) Gateway (P-GW), a radio access network (RAN) node, a next generation RAN (NG-RAN) node, a gNB, an eNB, a gNB central unit (gNB-CU), a gNB distributed unit (gNB-DU) a data network, a core network or a Radio Network Controller (RNC), and is not limited herein. In addition, the wireless network node 40 may comprise (perform) at least one network function such as an access and mobility management function (AMF), a session management function (SMF), a user place function (UPF), a policy control function (PCF), an application function (AF), etc. In an embodiment, the wireless network node 40 may be a blockchain participant/node of a blockchain network. The wireless network node 40 may include a processor 400 such as a microprocessor or ASIC, a storage unit 410 and a communication unit 420. The storage unit 410 may be any data storage device that stores a program code 412, which is accessed and executed by the processor 400. Examples of the storage unit 412 include but are not limited to a SIM, ROM, flash memory, RAM, hard-disk, and optical data storage device. The communication unit 420 may be a transceiver and is used to transmit and receive signals (e.g. messages or packets) according to processing results of the processor 400. In an example, the communication unit 420 transmits and receives the signals via at least one antenna 422 shown in FIG. 4.

In an embodiment, the storage unit 410 and the program code 412 may be omitted. The processor 400 may include a storage unit with stored program code.

The processor 400 may implement any steps described in exemplified embodiments on the wireless network node 40, e.g., via executing the program code 412.

The communication unit 420 may be a transceiver. The communication unit 420 may as an alternative or in addition be combining a transmitting unit and a receiving unit configured to transmit and to receive, respectively, signals to and from a wireless terminal (e.g. a user equipment or another wireless network node).

Figure 5:
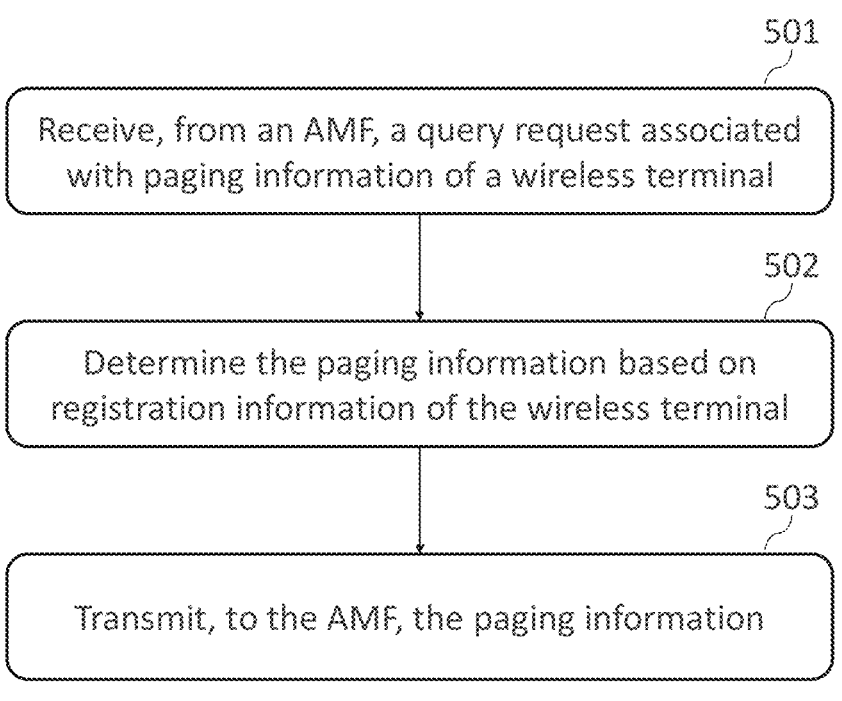
FIG. 5 shows a flowchart of a method according to an embodiment of the present disclosure.

FIG. 5 shows a flowchart of a process according to an embodiment of the present disclosure. The process shown in FIG. 5 may be used in a blockchain node (e.g. BS, satellite, RAN node, network function, AMF, unmanned aerial vehicle (UAV), or non-geostationary RAN node) in a blockchain network and comprises the following steps:

Step 501: Receive, from an AMF, a query request associated with paging information of a wireless terminal.

Step 502: Determine the paging information based on registration information of the wireless terminal.

Step 503: Transmit, to the AMF, the paging information.

In this embodiment, the registration information of wireless terminal(s) and/or operation plan of wireless network node(s) is stored on a blockchain. When the AMF needs to page one wireless terminal (e.g. UE), the AMF sends a query request a blockchain node (e.g. a blockchain network or one or more blockchain nodes of the blockchain network) associated with the blockchain storing the registration information of wireless terminal, to acquire/request paging information of the wireless terminal. In response to the query request, the blockchain node determines/calculates the paging information of the wireless terminal based on the registration information of the wireless terminal and transmits the determined/calculated paging information to the AMF.

In an embodiment, the paging information is determined/calculated via (a function of) an SC of the blockchain. For example, the blockchain node may deploy/invoke the SC associated with determining/calculating the registration information.

In an embodiment, the paging information comprises/is a paging route from the AMF to the wireless terminal.

In an embodiment, the paging route is determined based on the registration information and an operation plan of a wireless network node serving the wireless terminal. The operation plan is also stored on the blockchain.

In an embodiment, the operation plan comprises at least one of ephemerides, a frequency plan, an inter satellite link status or beam plan.

In an embodiment, the registration information comprises at least one of a wireless terminal identifier, geolocation information, a registration time or a predefined trajectory.

In an embodiment, the blockchain node may transmit the registration information of the wireless terminal as the paging information and the AMF determines/calculates the paging route to the wireless terminal itself.

Figure 6:
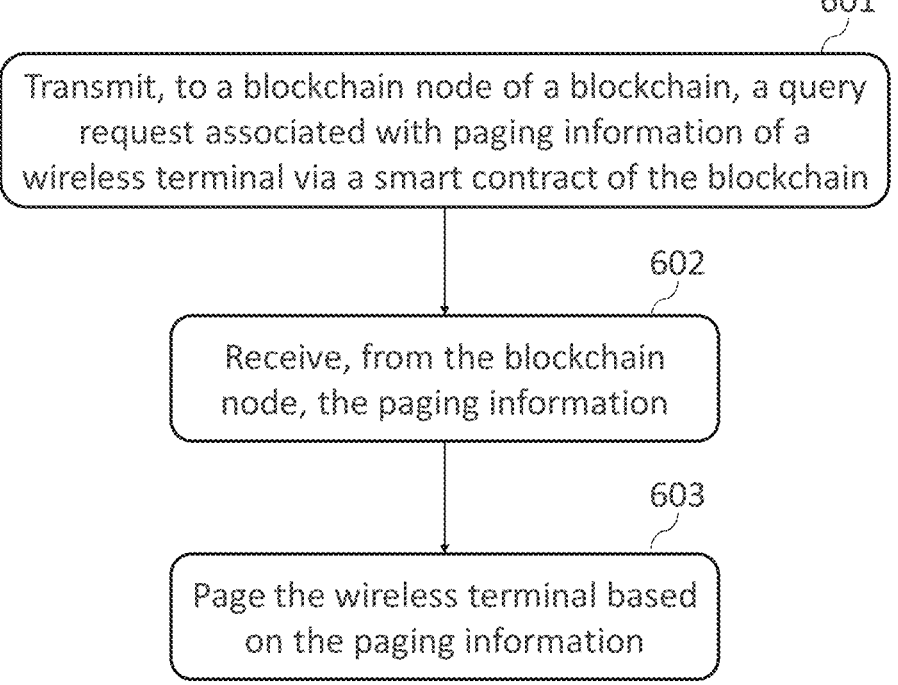
FIG. 6 shows a flowchart of a method according to an embodiment of the present disclosure.

FIG. 6 shows a flowchart of a process according to an embodiment of the present disclosure. The process shown in FIG. 6 may be used in an AMF (e.g. a wireless device performing/comprising the AMF or a wireless device performing/comprising some or all of the functions of the AMF) and comprises the following steps:

Step 601: Transmit, to a blockchain node of a blockchain, a query request associated with paging information of a wireless terminal via a smart contract of the blockchain.

Step 602: Receive, from the blockchain node, the paging information.

Step 603: Page the wireless terminal based on the paging information.

In this embodiment, registration information (e.g. at least one of a wireless terminal identifier, geolocation information, a registration time or a predefined trajectory) of each wireless terminal is stored on a blockchain. When the AMF needs to page the wireless terminal, the AMF transmits a query request to a blockchain node (e.g. a blockchain network or one or more blockchain nodes in the blockchain network) associated with the blockchain storing the registration information of the wireless terminal. Next, the AMF may receive the registration information and paging the wireless terminal based on the paging information.

In an embodiment, the paging information comprises a paging route from the AMF to the wireless terminal.

In an embodiment, the paging route is determined based on registration information of the wireless terminal and an operation plan of a wireless network node serving the wireless terminal. In this embodiment, both the registration information and the operation plan are stored on the blockchain.

In an embodiment, the operation plan comprises at least one of ephemerides, a frequency plan, an inter satellite link status or beam plan.

In an embodiment, the paging information may comprise the registration information of the wireless terminal. Under such a condition, the AMF determines/calculates a paging route of paging the wireless terminal itself and pages the wireless terminal based on the determined/calculated paging route.

In an embodiment of the AMF being one blockchain node/participant of the blockchain network, the AMF may directly determines/calculates the paging information of the wireless terminal based on the registration information of the wireless terminal stored on the blockchain without transmitting the query request. For instance, the AMF may deploy/invoke the SC associated with determining/calculating the registration information.

Figure 7:
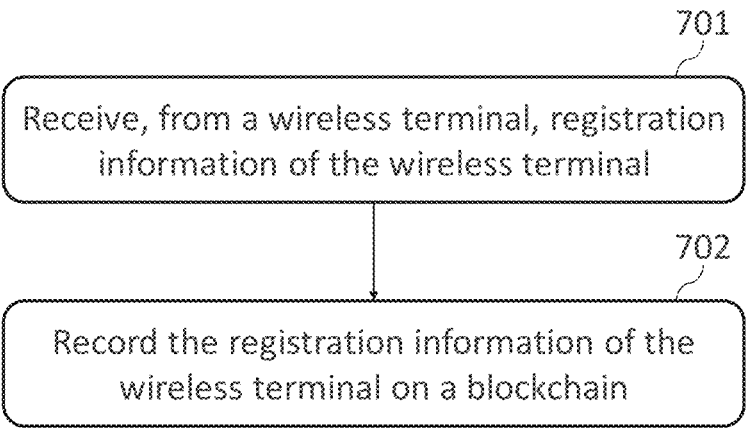
FIG. 7 shows a flowchart of a method according to an embodiment of the present disclosure.

FIG. 7 shows a flowchart of a process according to an embodiment of the present disclosure. The process shown in FIG. 7 may be used in wireless network node (e.g. BS, satellite, RAN node) and comprises the following steps:

Step 701: Receive, from a wireless terminal, registration information of the wireless terminal.

Step 702: Record the registration information of the wireless terminal on a blockchain.

Specifically, when receiving registration information (e.g. at least one of a wireless terminal identifier, geolocation information, a registration time or a predefined trajectory) of the wireless terminal, the wireless network node records the received registration information on a blockchain. For example, the wireless network node may record the registration information on the blockchain via an SC of the blockchain. That is, the wireless network node may deploy/invoke the SC associated with recording the registration information on the blockchain. As an alternative, the wireless network node may transmit the registration information to a blockchain network (e.g. at least one blockchain node/participants) associated with the blockchain and the blockchain network deploys/invokes the SC associated with recording the registration information on the blockchain.

In an embodiment, the registration information is received in a registration request or a registration update request. That is, the registration information may be received in a registration procedure (e.g. steps 201 to 202c shown in FIG. 2A) or an updating procedure (step 205 shown in FIG. 2A).

In an embodiment, the wireless network node may record both the registration information and network node information of the wireless network node on the blockchain. For example, the network node information may comprise at least one of node identifier, current time and node signature of the wireless network node.

In an embodiment, the wireless network node may further deactivate former registration information of the wireless terminal stored on the blockchain. In particular, the former registration information refers to the registration information which is corresponding to the wireless terminal and is recorded on the blockchain before receiving the registration information from the wireless terminal.

In an embodiment, the wireless network node deactivates the former registration information via an SC of the blockchain. That is, the wireless network node may deploy/invoke the SC associated with deactivating the former registration information.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any one of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any one of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A skilled person would further appreciate that any one of the various illustrative logical blocks, units, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software unit"), or any combination of these techniques.

To clearly illustrate this interchangeability of hardware, firmware and software, various illustrative components, blocks, units, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, unit, etc. can be configured to perform one or more of the functions described herein. The term "configured to" or "configured for" as used herein with respect to a specified operation or function refers to a processor, device, component, circuit, structure, machine, unit, etc. that is physically constructed, programmed and/or arranged to perform the specified operation or function.

Furthermore, a skilled person would understand that various illustrative logical blocks, units, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, units, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein. If implemented in software, the functions can be stored as one or more instructions or code on a computer-readable medium. Thus, the steps of a method or algorithm disclosed herein can be implemented as software stored on a computer-readable medium.

Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "unit" as used herein, refers to software, firmware, hardware, and any combination of these elements for performing the associated functions described herein. Additionally, for purpose of discussion, the various units are described as discrete units; however, as would be apparent to one of ordinary skill in the art, two or more units may be combined to form a single unit that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A wireless communication method for use in a blockchain node, the method comprising:

receiving, from an access and mobility management function, a query request associated with paging information of a wireless terminal, determining the paging information based on registration information of the wireless terminal, wherein the registration information is stored on a blockchain, and transmitting, to the access and mobility management function, the paging information, wherein the paging information is determined via a smart contract of the blockchain, wherein the paging information comprises a paging route, the paging route being a path through one or more wireless network nodes from the access and mobility management function to the wireless terminal, and wherein the paging route is determined based on the registration information and an operation plan of a wireless network node serving the wireless terminal, wherein the operation plan is stored on the blockchain, and the operation plan comprises at least one of ephemerides, a frequency plan, an inter satellite link status or beam plan.

2. The wireless communication method of claim 1, wherein the registration information comprises at least one of a wireless terminal identifier, geolocation information, a registration time or a predefined trajectory.

3. A wireless communication method for use in an access and mobility management function, the method comprising:

transmitting, to a blockchain node associated with a blockchain, a query request associated with paging information of a wireless terminal via a smart contract of the blockchain, receiving, from the blockchain node, the paging information, and paging the wireless terminal based on the paging information, wherein the paging information comprises a paging route, the paging route being a path through one or more wireless network nodes from the access and mobility management function to the wireless terminal, and wherein the paging route is determined based on registration information of the wireless terminal and an operation plan of a wireless network node serving the wireless terminal, wherein the registration information and the operation plan are stored on the blockchain, wherein the operation plan comprises at least one of ephemerides, a frequency plan, an inter satellite link status or beam plan.

4. The wireless communication method of claim 3, wherein the paging information is determined based on registration information of the wireless terminal stored on the blockchain.

5. The wireless communication method of claim 3, wherein the registration information comprises at least one of a wireless terminal identifier, geolocation information, a registration time or a predefined trajectory.

6. A wireless device comprising an access and mobility management function, comprising:

a communication unit, configured to:

transmit, to a blockchain node associated with a blockchain, a query request associated with paging information of a wireless terminal via a smart contract of the blockchain, and receive, from the blockchain node, the paging information, and a processor configured to page the wireless terminal based on the paging information, wherein the paging information comprises a paging route, the paging route being a path through one or more wireless network nodes from the access and mobility management function to the wireless terminal, and wherein the paging route is determined based on registration information of the wireless terminal and an operation plan of a wireless network node serving the wireless terminal, wherein the registration information and the operation plan are stored on the blockchain, wherein the operation plan comprises at least one of ephemerides, a frequency plan, an inter satellite link status or beam plan.

7. The wireless device of claim 6, wherein the registration information comprises at least one of a wireless terminal identifier, geolocation information, a registration time or a predefined trajectory.

* * * * *